United States Patent Office 3,790,658
Patented Feb. 5, 1974

3,790,658
PURIFICATION PROCESS FOR RECOVERING URANIUM FROM AN ACIDIC AQUEOUS SOLUTION BY pH CONTROL
Joseph S. Fox, Lewiston, N.Y., and Jerome D. Koetting, Parkersburg, W. Va., assignors to Union Carbide Corporation, New York, N.Y.
No Drawing. Filed May 15, 1970, Ser. No. 37,870
Int. Cl. C01g 43/00
U.S. Cl. 423—15
10 Claims

ABSTRACT OF THE DISCLOSURE

A process for obtaining purified uranium values from an acidic aqueous solution contaminated with iron, vanadium, phosphorus and sodium values by seelctively precipitating the contaminants through acidity (pH) control of the solution.

FIELD OF THE INVENTION

This invention relates to a process for recovering purified uarnium values from an acidic aqueous solution contaminated with impurities of iron, vanadium, phosphorus and/or sodium values. The process comprises essentially dium, phosphorus and sodium values by selectively precipitation of the impurities is accomplished by controlling the pH value of the solution.

DESCRIPTION OF THE PRIOR ART

Various loading and stripping processes are employed in the purification of metals such as uranium. These processes are time consuming and costly if the effective elimination of impurities, such as iron, phosphorus, vanadium and/or sodium, are to be substantially removed. Hundreds of different organo-nitrogen compounds, organophosphorus compounds, as well as a wide variety of other acidic, basic, neutral and amphoteric reagents, have been examined for their ability to extract uranium from aqueous solutions but upon spectroscopic analysis of the end product, an objectionable level of iron, vanadium, phosphorus and/or sodium was present. Elimination of these impurities to a tolerable level can be accomplished by solvent extraction techniques, but a great expenditure of time and money is required. These techniques naturally are not conducive to the production of high purity uranium at a relatively low price. With a view to overcoming these prior art limitations, the present invention discloses a two stage precipitation process whereby high purity uranium can be processed at a relatively low price, such uranium being substantially free of iron, vanadium, phosphorus and/or sodium contaminants.

SUMMARY OF THE INVENTION

The substantial removal of contaminants such as iron, vanadium, phosphorus and/or sodium values from an acidic solution of uranium having a pH value of about 2 or less is accomplished by a two-stage acidity control process which effectively precipitates the contaminants at selective pH values. Specifically, uranium eluate prepared from a conventional ion-exchange process and having a pH value of about 2 or less will usually contain iron, phosphorus and vanadium values in undesirable amounts. To substantially remove these values according to this invention the acidic uranium solution is heated to between about 60° C. and about 100° C., and preferably between 70° C. and about 90° C., and then oxidized with sufficient sodium chlorate $NaClO_3$, sodium peroxide $Na_2O_2$, or hydrogen peroxide $H_2O_2$, to raise the iron, vanadium and uranium values to their highest valence state. This usually requires the oxidation of the solution to a negative potential of about 650 millivolts or more, that is, a more negative potential such as minus 700 or 800 millivolts. For example, an amount of sodium chlorate between about 0.02 and about 0.04 gram per gram of uranium in the acidic solution is usually sufficient to oxidize the solution to a negative oxidation potential of at least 650 millivolts. The heated oxidized uranium solution is then fed a sufficient amount of iron sulfate, $Fe_2(SO_4)_3$, to react with substantially all the phosphorus in the solution to form ferric phosphate, $FePO_4$, some of which precipitates at this stage of the process. Usually an amount of iron sulfate between about 0.3 and about 0.8 gram per gram of uranium in the solution is sufficient for this reaction.

Thereafter sufficient ammonium hydroxide, $NH_4OH$ or ammonia, $NH_3$ is added to bring the pH value of the uranium solution to between about 2.0 and about 2.9 and then held at the selected pH value for a period of time sufficient to substantially precipitate the vanadium present in the solution along with some iron. Preferably a pH range between about 2.3 and about 2.6 along with a holding time period of at least 10 minutes is desirable.

The second stage of the process is initiated by raising the pH value of the solution to between about 4.0 and about 4.9 and holding the solution at the selected pH value for a time period sufficient to substantially precipitate the remaining iron present as ferric hydroxide, $Fe(OH)_3$, and phosphorus present as ferric phosphate, $FePO_4$. However the holding period should not be extended in time to a point where the vanadium precipitate will redissolve in the solution. Preferably a pH range between about 4.1 and about 4.5 along with a holding time period of between about 3 and about 15 minutes is desirable for this stage of the process.

The solution is then filtered whereupon the remaining filtrate will contain 98% or more of the uranium originally contained in the acidic solution and will be substantially free of iron, vanadium and phosphorus values.

It is also possible to filter the solution after obtaining the desired pH value of between 2.0 and 2.9 to substantially remove the vanadium precipitate so as to essentially eiminate the possibility of having the vanadium redissolved in the solution when the solution is raised to the higher pH value between 4.0 and 4.9. The holding period for the selected pH value in the higher range can then be broadened to about 3 minutes or longer before filtering the solution.

When sodium values are present in the final filtrate in an undesirable amount, as above one percent, then an additional step can be added to substantially reduce the sodium values without decreasing the amount of uranium values by more than one percent. This step comprises the adding of $NH_4OH$ or $NH_3$ to the filtrate in sufficient amount to raise the pH value of the solution to between about 6.5 and about 7.5. The solution is then held at the selected pH value for a time sufficient to precipitate ammonium diuranate which is then filtered out by conventional filtering means. An inorganic acid, such as sulfuric acid $H_2SO_4$, hydrochloric acid HCl, nitric acid $HNO_3$, or the like is added to dissolve this precipitated ammonium diuranate whereupon an additional amount of $NH_4OH$ or $NH_3$ is then added to bring the pH value of the solution to within the same 6.5 to 7.5 range so as to reprecipitate the ammonium diuranate. The solution upon being filtered will leave a precipitate of ammonium diuranate containing over 99% of the uranium originally contained in the initial filtrate while decreasing the sodium value substantially to less than ½ of 1 percent.

The small amount of uranium oxide remaining in the residue after the filtration step at a pH value within the 4.0 to 4.9 range can be recovered by recycling the solution back into a kiln if so desired.

This simple and inexpensive process can be performed in relatively simple apparatus for large scale production of uranium with the physical separation of the uranium by filtration being effected by gravity.

Example

One liter of uranium eluate obtained from an ion-exchange process was chemically and spectroscopically analyzed and found to contain the following substances:

|  | G./liter |
|---|---|
| Uranium oxide ($U_3O_8$) | 4.29 |
| Iron (Fe) | 0.16 |
| Vanadium pentoxide ($V_2O_5$) | 0.08 |
| Arsenic (As) | 0.03 |
| Molybdenum (Mo) | 0.004 |
| Sodium (Na) | 18.6 |
| Sulfate radical ($SO_4$) | 13.6 |
| Chloride radical (Cl) | 28.4 |
| Phosphate radical ($PO_4$) | 0.006 |

Uranium processed from this solution, such as yellow cake, would yield a product having excess amounts of iron, vanadium, phosphorus and sodium values. For example, yellow cake so processed would contain 3.71% Fe, 1.36% $V_2O_5$, .67% $PO_4$ and 1.8% Na while only 75.2% would be uranium.

To decrease these contaminants, the one liter of the acidic uranium eluate was heated to 80° C. and then oxidized with 0.103 gram of sodium chlorate, $NaClO_3$, or approximately 0.024 gram of $NaClO_3$ per gram of $U_3O_8$ in the solution. This amount of $NaClO_3$ reduced the oxidation potential of the solution to minus 750 millivolts. Iron sulfate in an amount of 1.716 grams or approximately 0.40 gram per gram of $U_3O_8$ was added to the oxidized solution to react with all the phosphorus in the solution to form $FePO_4$. Ammonium hydroxide, $NH_4OH$, was fed into the solution in an amount which brought the pH value of the solution to 2.3. The solution was held at this value for one hour and then an additional amount of $NH_4OH$ was added to raise the pH value to 4.2. At this pH value the solution was held for five minutes after which it was filtered through a No. 42 Whatman grade filter paper. The filtrate was analyzed and found to contain the following components which are compared with the identical components chemically analyzed in the initial uranium solution.

|  | Initial solution, g./liter | Filtrate solution, g./liter | Percent decrease |
|---|---|---|---|
| $U_3O_8$ | 4.29 | 4.25 | 1 |
| $V_2O_5$ | 0.08 | 0.004 | 95 |
| Fe | 0.16 | 0.001 | 99 |
| $PO_4$ | 0.006 | 0.0006 | 90 |

The above table shows a decrease in the $U_3O_8$ from the amount initially present in the acidic solution of only 1% while the contaminants of $V_2O_5$, Fe and $PO_4$ are reduced by 95%, 99% and 90%, respectively.

The uranium filtrate, still containing substantially all the original sodium, was fed an additional amount of $NH_4OH$ to raise the pH value to 7.4. At this pH value ammonium diuranate, $(NH_4)_2U_2O_7$, was precipitated and then the solution was filtered. The residue containing the ammonium diuranate was dissolved with sulfuric acid and ammonium hydroxide was again added to bring the pH value to 7.4. After the ammonium diuranate in the solution precipitated at this pH value, the solution was filtered leaving the ammonium diuranate in the residue substantially free of sodium. Upon analysis, it was found that only 0.03% of the residue was sodium which when expressed in terms of grams per liter is only 0.001 gram per liter. This was a decrease of over 99% from the 18.6 grams per liter of sodium originally contained in the solution while only less than 1% of the original $U_3O_8$ was sacrificed or lost in the filtrate.

The uranium so processed according to this invention could produce a uranium product which would meet substantially all the present commercial specifications for a relatively pure uranium product.

What is claimed is:

1. A process for recovering purified uranium values from an acidic aqueous solution containing contaminants of iron, vanadium and phosphorus comprising the steps:
   (a) preparing an acidic aqueous solution of uranium having a pH value of 2 or less;
   (b) heating said solution to between about 60° C. and about 100° C.;
   (c) oxidizing said heated solution with a sufficient amount of a material selected from a group consisting of sodium chlorate, sodium peroxide and hydrogen peroxide to raise the iron, vanadium and uranium values in the solution to their highest valence state and provide in said solution a negative oxidation potential of at least 650 millivolts;
   (d) adding to the oxidized solution a sufficient amount of iron sulfate in the range of about 0.3 to 0.8 gram per gram of uranium in said solution to react with substantially all the phosphorus therein to form ferric phosphate and precipitate a portion thereof;
   (e) adding a material selected from a group consisting of ammonium hydroxide and ammonia to the solution in an amount sufficient to increase the pH value of the solution to between about 2.3 and about 2.9 and holding the solution at the selected pH value for a time period sufficient to precipitate substantially all the vanadium from the solution;
   (f) adding a material selected from a group consisting of ammonium hydroxide and ammonia to the solution in an amount sufficient to increase the pH value of the solution to between about 4 and about 4.9 and holding the solution at the selected pH value for between about three and fifteen minutes to precipitate substantially all the iron and phosphorus from the solution; and
   (g) thereafter filtering said solution.

2. The process of claim 1 wherein said acidic aqueous solution is a uranium eluate prepared from an ion-exchange process.

3. The process of claim 2 wherein a filtering step $e_1$ is added between steps (e) and (f) so as to remove substantially all of the vanadium from the solution and then using the filtrate as the solution for step (f).

4. The process of claim 2 wherein said eluate in step (b) is heated to between about 70° C. and about 90° C.; in step (c) said heated eluate is oxidized with sodium chlorate in an amount between about 0.02 and about 0.04 gram per gram of uranium in the eluate; in step (d) said iron sulfate is added to the oxidized eluate in an amount between about 0.3 and about 0.8 gram per gram of uranium in the eluate; in step (e) ammonium hydroxide is added in an amount sufficient to increase the pH value of the eluate to between about 2.3 and about 2.6 and then holding the eluate at the selected pH value for at least 10 minutes; and in step (f) ammonium hydroxide is added in an amount sufficient to increase the pH value of the eluate to between about 4.1 and about 4.5 and then holding the eluate at the selected pH value for a time period between about 3 and about 15 minutes.

5. The process of claim 3 wherein step (b) said uranium eluate is heated to between about 70° C. and about 90° C.; in step (c) said heated eluate is oxidized with sodium chlorate in an amount between about 0.02 and about 0.04 gram per gram of uranium in the eluate; in step (d) said iron sulfate is added to the oxidized eluate in an amount between about 0.3 and about 0.8 gram per gram of uranium in the eluate; in step (e) ammonium hydroxide is added in an amount sufficient to increase the pH value of the eluate to between about 2.3 and about 2.6 and then holding the eluate at the selected pH value for at least 10 minutes; and in step (f) ammonium hydroxide is added in an amount sufficient to increase the pH value of the eluate to between about 4.1 and about 4.5 and then holding the eluate at the selected pH value for at least 3 minutes.

6. The process of claim 1 wherein the following steps are added after step (g) when sodium values are present in the solution:
   (h) adding a material selected from a group consisting of ammonium hydroxide and ammonia to the filtrate of step (g) in an amount sufficient to increase the pH value of the solution to between about 6.5 and about 7.5 to precipitate ammonium diuranate;
   (i) filtering said solution to collect the precipitated ammonium diuranate as a residue;
   (j) dissolving said ammonium diuranate residue with an inorganic acid selected from the group consisting of sulfuric acid, hydrochloric acid and nitric acid to form a uranium solution;
   (k) adding a material selected from a group consisting of ammonium hydroxide and ammonia to the uranium solution in an amount sufficient to increase the pH value of the solution to between about 6.5 and about 7.5; and
   (l) filtering said solution.

7. The process of claim 4 wherein the following steps are added after step (g) when sodium values are present in the solution:
   (h) adding a material selected from a group consisting of ammonium hydroxide and ammonia to the filtrate of step (g) in an amount sufficient to increase the pH value of the solution between about 6.5 and about 7.5 to precipitate ammonium diuranate;
   (i) filtering said solution to collect the precipitated ammonium diuranate as a residue;
   (j) dissolving said ammonium diuranate residue with an inorganic acid selected from the group consisting of sulfuric acid, hydrochloric acid and nitric acid to form a uranium solution;
   (k) adding a material selected from a group consisting of ammonium hydroxide and ammonia to the uranium solution in an amount sufficient to increase the pH value of the solution between about 6.5 and about 7.5; and
   (l) filtering said solution.

8. The process of claim 5 wherein the following steps are added after step (g) when sodium values are present in the solution:
   (h) adding a material selected from a group consisting of ammonium hydroxide and ammonia to the filtrate of step (g) in an amount sufficient to increase the pH value of the solution between about 6.5 and about 7.5 to precipitate ammonium diuranate;
   (i) filtering said solution to collect the precipitated ammonium diuranate as a residue;
   (j) dissolving said ammonium diuranate residue with an inorganic acid selected from the group consisting of sulfuric acid, hydrochloric acid and nitric acid to form a uranium solution;
   (k) adding a material selected from a group consisting of ammonium hydroxide and ammonia to the uranium solution in an amount sufficient to increase the pH value of the solution to between about 6.5 and about 7.5; and
   (l) filtering said solution.

9. The process of claim 4 wherein said eluate in step (b) is heated to about 80° C.; in step (c) said heated eluate is oxidized with about 0.024 gram of sodium chlorate per gram of uranium in the eluate; in step (d) said iron sulfate is added to the oxidized eluate in an amount about 0.4 gram per gram of uranium in the eluate; in step (e) ammonium hydroxide is added in an amount to increase the pH value of the eluate to about 2.3 and then holding the eluate at this pH value for at least 10 minutes; and in step (f) ammonium hydroxide is added in an amount sufficient to increase the pH value of the eluate to about 4.2 and then holding the eluate at this pH value for about five minutes.

10. The process of claim 9 wherein the following steps are added after step (g) when sodium is present in the solution:
   (h) adding ammonium hydroxide to the filtrate of step (g) in an amount sufficient to increase the pH value of the eluate to about 7.4 to precipitate ammonium diuranate;
   (i) filtering said eluate to collect the precipitated ammonium diuranate as a residue;
   (j) dissolving said ammonium diuranate residue with sulfuric acid to form a uranium solution;
   (k) adding ammonium hydroxide in an amount sufficient to increase the pH value of the solution to about 7.4; and
   (l) filtering said solution.

References Cited
UNITED STATES PATENTS

| | | | |
|---|---|---|---|
| 3,402,026 | 9/1968 | Goren | 23—19 R |
| 2,749,211 | 6/1956 | Lundquist | 23—321 |
| 2,779,657 | 1/1957 | Ballard | 23—335 |
| 2,992,892 | 7/1961 | Goren | 23—140 |
| 2,176,610 | 10/1939 | Stamberg | 23—19 R |
| 3,190,719 | 6/1965 | Kelmers et al. | 23—24 R |
| 3,510,273 | 5/1970 | Fitzhugh et al. | 23—321 |

CARL D. QUARFORTH, Primary Examiner

F. M. GITTES, Assistant Examiner

U.S. Cl. X.R.

423—6, 11, 18, 20, 67, 140